(12) United States Patent
Wang

(10) Patent No.: US 11,973,967 B2
(45) Date of Patent: Apr. 30, 2024

(54) ORDERING OF NAL UNITS IN CODED VIDEO

(71) Applicant: Bytedance Inc., Los Angeles, CA (US)

(72) Inventor: Ye-kui Wang, San Diego, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/989,399

(22) Filed: Nov. 17, 2022

(65) Prior Publication Data
US 2023/0077806 A1     Mar. 16, 2023

Related U.S. Application Data

(63) Continuation of application No. PCT/US2021/033731, filed on May 21, 2021.

(60) Provisional application No. 63/029,334, filed on May 22, 2020.

(51) Int. Cl.
| | |
|---|---|
| *H04N 19/46* | (2014.01) |
| *H04N 7/01* | (2006.01) |
| *H04N 19/169* | (2014.01) |
| *H04N 19/172* | (2014.01) |
| *H04N 19/70* | (2014.01) |

(52) U.S. Cl.
CPC ............ *H04N 19/46* (2014.11); *H04N 7/01* (2013.01); *H04N 19/172* (2014.11); *H04N 19/188* (2014.11); *H04N 19/70* (2014.11)

(58) Field of Classification Search
CPC ...................................... H04N 19/46
USPC ................................... 375/240.26
See application file for complete search history.

(56) References Cited

U.S. PATENT DOCUMENTS

| | | | |
|---|---|---|---|
| 2015/0023405 A1 | 1/2015 | Joshi et al. | |
| 2015/0271506 A1* | 9/2015 | Hendry | H04N 19/31 375/240.26 |
| 2015/0271526 A1 | 9/2015 | Hendry | |
| 2015/0373345 A1* | 12/2015 | Ramasubramonian | H04N 19/105 375/240.26 |
| 2016/0065980 A1 | 3/2016 | Choi | |
| 2017/0180737 A1 | 6/2017 | Ye et al. | |

(Continued)

FOREIGN PATENT DOCUMENTS

| | | |
|---|---|---|
| CN | 106105223 A | 11/2016 |
| CN | 106105224 A | 11/2016 |

(Continued)

OTHER PUBLICATIONS

Non-Final Office Action dated Mar. 14, 2023, 18 pages, U.S. Appl. No. 17/988,934, filed Nov. 17, 2022.

(Continued)

*Primary Examiner* — Yulin Sun
(74) *Attorney, Agent, or Firm* — Conley Rose, P.C.

(57) ABSTRACT

Examples of video encoding methods and apparatus and video decoding methods and apparatus are described. An example method of video processing includes performing a conversion between a video and a bitstream of the video. The bitstream includes one or more layers including one or more network abstraction layer (NAL) units according to a format rule that specifies that a first layer identifier in a header of an end of sequence network abstraction layer (EOS NAL) unit is required to be equal to a second layer identifier of one of the one or more layers in the bitstream.

20 Claims, 9 Drawing Sheets

(56) References Cited

U.S. PATENT DOCUMENTS

| | | | |
|---|---|---|---|
| 2018/0227626 A1 | 8/2018 | Nakazawa et al. | |
| 2019/0012839 A1 | 1/2019 | Wang | |
| 2019/0306494 A1 | 10/2019 | Chang et al. | |
| 2020/0045323 A1 | 2/2020 | Hannuksela | |
| 2020/0154116 A1 | 5/2020 | Wang | |
| 2021/0297704 A1* | 9/2021 | Chang | H04N 19/82 |
| 2022/0217386 A1* | 7/2022 | Wang | H04N 19/187 |

FOREIGN PATENT DOCUMENTS

| | | |
|---|---|---|
| EP | 3123723 B1 | 4/2018 |
| JP | 2017509254 A | 3/2017 |
| JP | 2017513352 A | 5/2017 |
| JP | 2017523669 A | 8/2017 |
| JP | 2019520739 A | 7/2019 |
| KR | 20160132874 A | 11/2016 |
| KR | 20160132875 A | 11/2016 |
| WO | 2015142712 A1 | 9/2015 |
| WO | 2015142725 A1 | 9/2015 |
| WO | 2021061462 A1 | 4/2021 |

OTHER PUBLICATIONS

Foreign Communication From A Related Counterpart Application, Indian Application No. 202247066149 dated Feb. 28, 2023, 6 pages.
Document: JVET-R2001-vA, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 524 pages.
"Series H: Audiovisual and Multimedia Systems Infrastructure of audiovisual services—Coding of moving video High efficiency video coding," ITU-T and ISO/IEC, Rec. ITU-T H.265 | ISO/IEC 23008-2 (in force edition), Feb. 2018, 692 pages.
Document: JVET-G1001-v1, Chen, J., et al., "Algorithm description of Joint Exploration Test Model 7 (JEM7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.
VTM software, Retrieved from the internet: https://vcgit.hhi.fraunhofer.de/jvet/VVCSoftware_VTM.git, Feb. 8, 2023, 3 pages.
Foreign Communication From A Related Counterpart Application, PCT Application No. PCT/US2021/033724, International Search Report dated Sep. 30, 2021, 15 pages.
Foreign Communication From A Related Counterpart Application, PCT Application No. PCT/US2021/033731, International Search Report dated Oct. 19, 2021, 14 pages.
Document: JVET-R0163-v2, Chen, J., et al., "AHG9: On Picture Header," Joint Video Experts Team (JVET) of ITU-T SG 16 WP 3 and ISO/IEC JTC 1/SC 29/WG 11 18th Meeting: by teleconference, Apr. 15-24, 2020, 5 pages.
Document: JVET-R0274-v2, Seregin, V., et al., "AHG8: On CVSS AU," Joint Video Experts Team (JVET) of ITU-T SG 16 WP 3 and ISO/IEC JTC 1/SC 29/WG 11 18th Meeting: by teleconference, Apr. 15-24, 2020, 4 pages.
Document: JVET-Q0113-v1, Wang, Y.K., et al., "AHG9/AHG8/AHG12: Some general HLS syntax cleanups," Joint Video Experts Team (JVET) of ITU-T SG 16 WP 3 and ISO/IEC JTC 1/SC 29/WG 11 17th Meeting: Brussels, BE, Jan. 7-17, 2020, 6 pages.
Document: JVET-S2001-vH, Bross, B., et al., "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 548 pages.
Hannuksela, M., et al., "VVC subpictures in ISO/IEC 14496-15" ISO/IEC FDIC 14496-15: 2014, "Information technlogy—Coding of audio-visual objects—Part 15: Carriage of network abstraction layer (NAL) unit structured video in the ISO base media file format," Jan. 13, 2014, Retrieved from the Internet: URL:http://phenix.int—evry.fr/mpeg/doc_end_user/documents/129_Brussels/wg11/m52209-v1-m52209_VVC_FF_subpictures.zipm52209_VVC_FF_subpictures_spec.docx, 203 pages.
Document: JVET-P0125-v2, Wang, Y.K., "AHG8/AHG17: Miscellaneous HLS topics," Joint Video Experts Team (JVET) f ITU-T SG 16 WP 3 and ISO/IEC JTC 1/SC 29/WG 11 16th Meeting: Geneva, CH, Oct. 1-11, 2019, 3 pages.
Extended European Search Report from European Application No. 21808809.4 dated Sep. 5, 2023, 10 pages.
Extended European Search Report from European Application No. 21807811.1 dated Sep. 12, 2023, 11 pages.

* cited by examiner

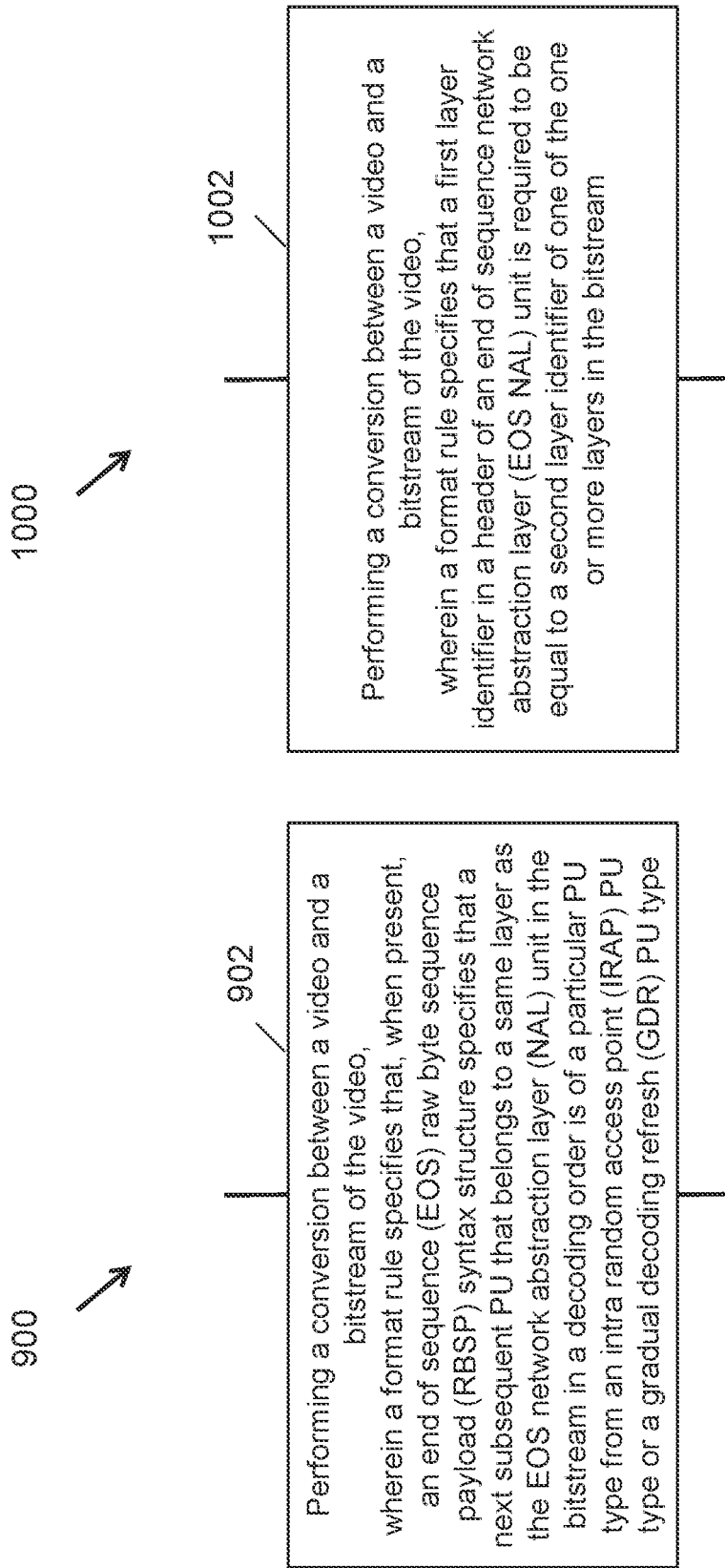

ORDERING OF NAL UNITS IN CODED VIDEO

CROSS REFERENCE TO RELATED APPLICATIONS

This application is a continuation of International Patent Application No. PCT/US2021/033731, filed on May 21, 2021 which claims the priority to and benefits of U.S. Provisional Patent Application No. 63/029,334, filed on May 22, 2020. All the aforementioned patent applications are hereby incorporated by reference in their entireties.

TECHNICAL FIELD

The present disclosure relates to image and video encoding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present disclosure discloses embodiments that can be used by video encoders and decoders to perform video encoding or decoding.

In one example aspect, a video processing method is disclosed. The method includes performing a conversion between a video and a bitstream of the video, wherein the bitstream conforms to a format rule, wherein the bitstream comprises one or more layers comprising one or more picture units (PUs), wherein the format rule specifies that, responsive to a first PU in a layer of the bitstream following an end of sequence network abstraction layer (EOS NAL) unit in the layer in a decoding order, a variable of the first PU is set to a particular value, wherein the variable indicates whether the first PU is a coded layer video sequence start (CLVSS) PU.

In another example aspect, another video processing method is disclosed. The method includes performing a conversion between a video and a bitstream of the video, wherein the bitstream includes one or more layers comprising one or more picture units (PUs) according to a format rule; wherein the format rule specifies that a PU of a particular layer after an end of sequence network abstraction layer (EOS NAL) unit of the particular layer is a particular type of PU. In some embodiments, the particular type of PU is one of an intra random access point (TRAP) type or a gradual decoding refresh (GDR) type. In some embodiments, the particular type of PU is a coded layer video sequence start (CLVSS) PU.

In another example aspect, another video processing method is disclosed. The method includes performing a conversion between a video and a bitstream of the video, wherein the bitstream includes one or more layers comprising one or more picture units (PUs) according to a format rule, wherein the format rule specifies that, when present, an end of sequence (EOS) raw byte sequence payload (RBSP) syntax structure specifies that a next subsequent PU that belongs to a same layer as the EOS network abstraction layer (NAL) unit in the bitstream in a decoding order is of a particular PU type from an intra random access point (TRAP) PU type or a gradual decoding refresh (GDR) PU type. In some embodiments, the particular PU type is the TRAP PU type. In some embodiments, the particular PU type is the GDR PU type.

In another example aspect, another video processing method is disclosed. The method includes performing a conversion between a video and a bitstream of the video, wherein the bitstream comprises one or more layers comprising one or more network abstraction layer (NAL) units according to a format rule, wherein the format rule specifies that a first layer identifier in a header of an end of sequence network abstraction layer (EOS NAL) unit is required to be equal to a second layer identifier of one of the one or more layers in the bitstream. In some embodiments, the format rule further allows for inclusion of more than one EOS NAL units in a picture unit (PU). In some embodiments, the format rule specifies that the first layer identifier of the EOS NAL unit is required to be less than or equal to a third layer identifier of a video coding layer (VCL) NAL unit associated with the EOS NAL unit.

In another example aspect, another video processing method is disclosed. The method includes performing a conversion between a video and a bitstream of the video, wherein the bitstream comprises one or more layers comprising one or more picture units (PUs) comprising one or more network abstraction layer (NAL) units according to format rule, wherein the format rule specifies that, responsive to a first NAL unit indicating an end of sequence in a PU, the first NAL unit is a last NAL unit among all NAL units within the PU other than another NAL unit, if present, indicating another end of sequence or indicating an end of the bitstream, if present. In some embodiments, the another NAL unit is an end of sequence (EOS) NAL unit. In some embodiments, the another NAL unit is an end of bitstream (EOB) NAL unit.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclosed. The code embodies one of the methods described herein in the form of processor-executable code.

In yet another example aspect, a method of storing a bitstream to a computer readable medium is disclosed. The bitstream is generated using an above-described method.

These, and other, features are described throughout the present disclosure.

BRIEF DESCRIPTION OF DRAWINGS

FIGS. 7 to 11 show flowcharts for various methods of video processing.

DETAILED DESCRIPTION

Figure 1:
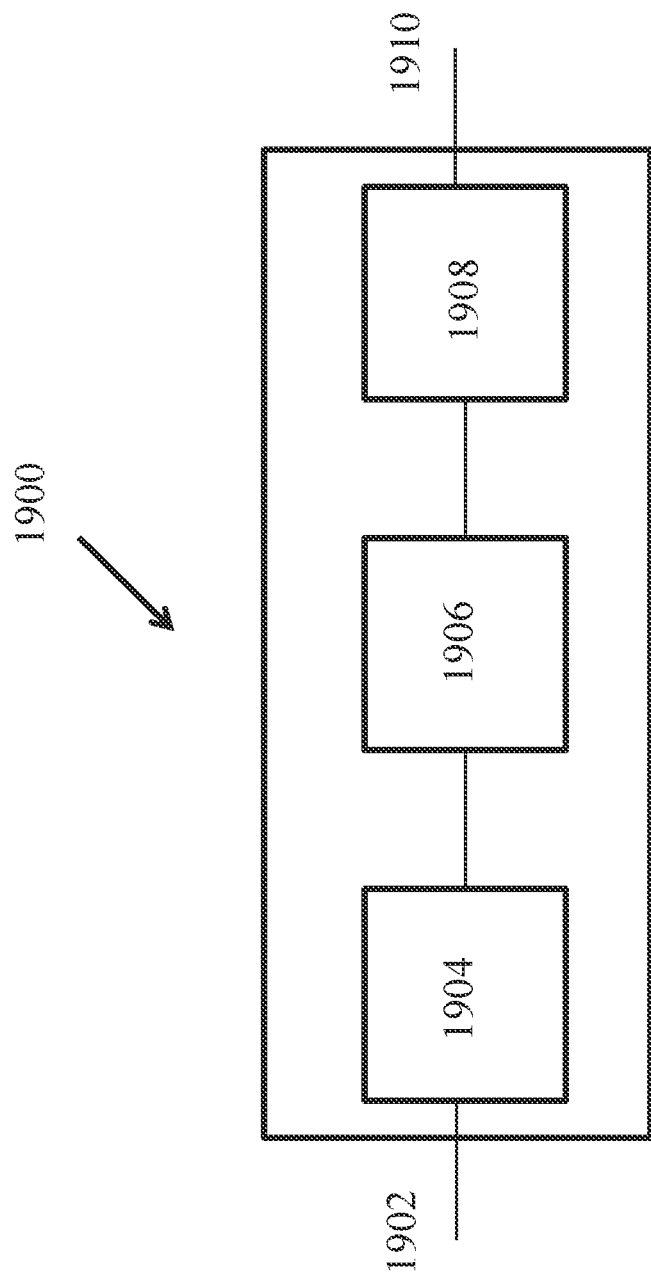
FIG. 1 is a block diagram that illustrates a video coding system in accordance with some embodiments of the present disclosure.

Section headings are used in the present disclosure for ease of understanding and do not limit the applicability of embodiments disclosed in each section only to that section. Furthermore, H.266 terminology is used in some description only for ease of understanding and not for limiting scope of the disclosed embodiments. As such, the embodiments described herein are applicable to other video codec protocols and designs also.

1. INTRODUCTION

This disclosure is related to video coding technologies. Specifically, it is about handling of EOS NAL units in video coding, particularly in the multi-layer and multi-sublayer contexts. The ideas may be applied individually or in various combination, to any video coding standard or non-standard video codec that supports multi-layer video coding, e.g., the being-developed Versatile Video Coding (VVC).

2. ABBREVIATIONS

APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
DCI Decoding Capability Information
DPB Decoded Picture Buffer
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
ILP Inter-Layer Prediction
ILRP Inter-Layer Reference Picture
JEM Joint Exploration Model
LTRP Long-Term Reference Picture
MCTS Motion-Constrained Tile Sets
NAL Network Abstraction Layer
OLS Output Layer Set
PH Picture Header
PPS Picture Parameter Set
PTL Profile, Tier and Level
PU Picture Unit
RADL Random Access Decodable Leading
RAP Random Access Point
RB SP Raw Byte Sequence Payload
SEI Supplemental Enhancement Information
SPS Sequence Parameter Set
STRP Short-Term Reference Picture
SVC Scalable Video Coding
VCL Video Coding Layer
VPS Video Parameter Set
VTM VVC Test Model
VUI Video Usability Information
VVC Versatile Video Coding

3. INITIAL DISCUSSION

Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC [1] standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM) [2]. The JVET meeting is concurrently held once every quarter, and the new coding standard is targeting a 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1. Reference Picture Management and Reference Picture Lists (RPLs)

Reference picture management is a core functionality that is necessary for any video coding scheme that uses inter prediction. It manages the storage and removal of reference pictures into and from a decoded picture buffer (DPB) and puts reference pictures in their proper order in the RPLs.

The reference picture management of HEVC, including reference picture marking and removal from the decoded picture buffer (DPB) as well as reference picture list construction (RPLC), differs from that of AVC. Instead of the reference picture marking mechanism based on a sliding window plus adaptive memory management control operation (MMCO) in AVC, HEVC specifies a reference picture management and marking mechanism based on so-called reference picture set (RPS), and the RPLC is consequently based on the RPS mechanism. An RPS consists of a set of reference pictures associated with a picture, consisting of all reference pictures that are prior to the associated picture in decoding order, that may be used for inter prediction of the associated picture or any picture following the associated picture in decoding order. The reference picture set consists of five lists of reference pictures. The first three lists contain all reference pictures that may be used in inter prediction of the current picture and that may be used in inter prediction of one or more of the pictures following the current picture in decoding order. The other two lists consist of all reference pictures that are not used in inter prediction of the current picture but may be used in inter prediction of one or more of the pictures following the current picture in decoding order. RPS provides an "intra-coded" signalling of the DPB status, instead of an "inter-coded" signalling as in AVC, mainly for improved error resilience. The RPLC process in HEVC is based on the RPS, by signalling an index to an RPS subset for each reference index; this process is simpler than the RPLC process in AVC.

Reference picture management in VVC is more similar to HEVC than AVC, but is somewhat simpler and more robust. As in those standards, two RPLs, list 0 and list 1, are derived, but they are not based on the reference picture set concept used in HEVC or the automatic sliding window process used in AVC; instead they are signalled more directly. Reference pictures are listed for the RPLs as either active and inactive entries, and only the active entries may be used as reference indices in inter prediction of CTUs of the current picture. Inactive entries indicate other pictures to be held in the DPB for referencing by other pictures that arrive later in the bitstream.

3.2. Random Access and its Supports in HEVC and VVC

Random access refers to starting access and decoding of a bitstream from a picture that is not the first picture of the bitstream in decoding order. To support tuning in and channel switching in broadcast/multicast and multiparty video conferencing, seeking in local playback and streaming, as well as stream adaptation in streaming, the bitstream needs to include frequent random access points, which are typically intra coded pictures but may also be inter-coded pictures (e.g., in the case of gradual decoding refresh).

HEVC includes signalling of intra random access points (TRAP) pictures in the NAL unit header, through NAL unit types. Three types of TRAP pictures are supported, namely instantaneous decoder refresh (IDR), clean random access (CRA), and broken link access (BLA) pictures. IDR pictures are constraining the inter-picture prediction structure to not reference any picture before the current group-of-pictures (GOP), conventionally referred to as closed-GOP random access points. CRA pictures are less restrictive by allowing certain pictures to reference pictures before the current GOP, all of which are discarded in case of a random access. CRA pictures are conventionally referred to as open-GOP random access points. BLA pictures usually originate from splicing of two bitstreams or part thereof at a CRA picture, e.g., during stream switching. To enable better systems usage of TRAP pictures, altogether six different NAL units are defined to signal the properties of the TRAP pictures, which can be used to better match the stream access point types as defined in the ISO base media file format (ISOBMFF) [6], which are utilized for random access support in dynamic adaptive streaming over HTTP (DASH) [7].

VVC supports three types of TRAP pictures, two types of IDR pictures (one type with or the other type without associated RADL pictures), and one type of CRA picture. These are basically the same as in HEVC. The BLA picture types in HEVC are not included in VVC, mainly due to two reasons: i) The basic functionality of BLA pictures can be realized by CRA pictures plus the end of sequence NAL unit, the presence of which indicates that the subsequent picture starts a new CVS in a single-layer bitstream. ii) There was a desire in specifying less NAL unit types than HEVC during the development of VVC, as indicated by the use of five instead of six bits for the NAL unit type field in the NAL unit header.

Another key difference in random access support between VVC and HEVC is the support of GDR in a more normative manner in VVC. In GDR, the decoding of a bitstream can start from an inter-coded picture and although at the beginning not the entire picture region can be correctly decoded but after a number of pictures the entire picture region would be correct. AVC and HEVC also support GDR, using the recovery point SEI message for signalling of GDR random access points and the recovery points. In VVC, a new NAL unit type is specified for indication of GDR pictures and the recovery point is signalled in the picture header syntax structure. A CVS and a bitstream are allowed to start with a GDR picture. This means that it is allowed for an entire bitstream to contain only inter-coded pictures without a single intra-coded picture. The main benefit of specifying GDR support this way is to provide a conforming behavior for GDR. GDR enables encoders to smooth the bit rate of a bitstream by distributing intra-coded slices or blocks in multiple pictures as opposed intra coding entire pictures, thus allowing significant end-to-end delay reduction, which is considered more important nowadays than before as ultralow delay applications like wireless display, online gaming, drone based applications become more popular.

Another GDR-related feature in VVC is the virtual boundary signalling. The boundary between the refreshed region (i.e., the correctly decoded region) and the unrefreshed region at a picture between a GDR picture and its recovery point can be signalled as a virtual boundary, and when signalled, in-loop filtering across the boundary would not be applied, thus a decoding mismatch for some samples at or near the boundary would not occur. This can be useful when the application determines to display the correctly decoded regions during the GDR process.

TRAP pictures and GDR pictures can be collectively referred to as random access point (RAP) pictures.

3.3. Picture Resolution Change within a Sequence

In AVC and HEVC, the spatial resolution of pictures cannot change unless a new sequence using a new SPS starts, with an TRAP picture. VVC enables picture resolution change within a sequence at a position without encoding an TRAP picture, which is always intra-coded. This feature is sometimes referred to as reference picture resampling (RPR), as the feature needs resampling of a reference picture used for inter prediction when that reference picture has a different resolution than the current picture being decoded.

The scaling ratio is restricted to be greater than or equal to 1/2 (2 times downsampling from the reference picture to the current picture), and less than or equal to 8 (8 times upsampling). Three sets of resampling filters with different frequency cutoffs are specified to handle various scaling ratios between a reference picture and the current picture. The three sets of resampling filters are applied respectively for the scaling ratio ranging from 1/2 to 1/1.75, from 1/1.75 to 1/1.25, and from 1/1.25 to 8. Each set of resampling filters has 16 phases for luma and 32 phases for chroma which is same to the case of motion compensation interpolation filters. Actually, the normal MC interpolation process is a special case of the resampling process with scaling ratio ranging from 1/1.25 to 8. The horizontal and vertical scaling ratios are derived based on picture width and height, and the left, right, top and bottom scaling offsets specified for the reference picture and the current picture.

Other aspects of the VVC design for support of this feature that are different from HEVC include: i) The picture resolution and the corresponding conformance window are signalled in the PPS instead of in the SPS, while in the SPS the maximum picture resolution is signalled. ii) For a single-layer bitstream, each picture store (a slot in the DPB for storage of one decoded picture) occupies the buffer size as required for storing a decoded picture having the maximum picture resolution.

3.4. Scalable Video Coding (SVC) in General and in VVC

Scalable video coding (SVC, sometimes also referred to as scalability in video coding) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the multiview or three-dimensional (3D) extension of the HEVC standard, there may be multiple views, and information of one view may be utilized to code (e.g., encode or decode) the information of another view (e.g., motion estimation, motion vector prediction, and/or other redundancies).

In SVC, the parameters used by the encoder or the decoder are grouped into parameter sets based on the coding level (e.g., video-level, sequence-level, picture-level, slice level, etc.) in which they may be utilized. For example, parameters that may be utilized by one or more coded video sequences of different layers in the bitstream may be included in a video parameter set (VPS), and parameters that are utilized by one or more pictures in a coded video sequence may be included in a sequence parameter set (SPS). Similarly, parameters that are utilized by one or more slices in a picture may be included in a picture parameter set (PPS), and other parameters that are specific to a single slice may be included in a slice header. Similarly, the indication of which parameter set(s) a particular layer is using at a given time may be provided at various coding levels.

Thanks to the support of reference picture resampling (RPR) in VVC, support of a bitstream containing multiple layers, e.g., two layers with standard definition (SD) and high definition (HD) resolutions in VVC can be designed without the need for any additional signal-processing-level coding tool, as upsampling needed for spatial scalability support can just use the RPR upsampling filter. Nevertheless, high-level syntax changes (compared to not supporting scalability) are needed for scalability support. Scalability support is specified in VVC version 1. Different from the scalability supports in any earlier video coding standards, including in extensions of AVC and HEVC, the design of VVC scalability has been made friendly to single-layer decoder designs as much as possible. The decoding capability for multi-layer bitstreams are specified in a manner as if there were only a single layer in the bitstream. For example, the decoding capability, such as DPB size, is specified in a manner that is independent of the number of layers in the bitstream to be decoded. Basically, a decoder designed for single-layer bitstreams does not need much change to be able to decode multi-layer bitstreams. Compared to the designs of multi-layer extensions of AVC and HEVC, the hypertext transfer protocol live streaming (HLS) aspects have been significantly simplified at the sacrifice of some flexibilities. For example, an TRAP AU is required to contain a picture for each of the layers present in the CVS.

3.5. Parameter Sets

AVC, HEVC, and VVC specify parameter sets. The types of parameter sets include SPS, PPS, APS, and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signalling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

4. TECHNICAL PROBLEMS SOLVED BY DISCLOSED TECHNICAL SOLUTIONS

The existing designs for handling of EOS NAL units in the latest VVC text (in JVET-R2001-vA/v10) have the following problems:

1) In clause 3 (Definitions), as part of the definition of CLVS picture, there is an issue with the phrase "the first PU in the layer of the bitstream that follows an EOS NAL unit in decoding order", because EOS NAL units are layer-specific and an EOS NAL unit only applies to the layer with nuh_layer_id equal to the nuh_layer_id of the EOS NAL unit. This would thus cause confusion and interoperability problems.

2) In clause 7.4.2.2 (NAL unit header semantics), it is specified that, when nal_unit_type is equal to PH NUT, EOS NUT, or FD NUT, nuh_layer_id shall be equal to the nuh_layer_id of associated VCL NAL unit. However, this does not fully enable temporal scalability, e.g., an operation of extraction of a temporal subset of a temporally scalable bitstream while keeping the EOS NAL units for each layer in the extraction output. For example, assuming there are two layers with nuh_layer_id equal to 0 and 1, and each layer has two sublayers with TemporalId equal to 0 and 1. In AU n with n greater than 0 and TemporalId equal to 1, there is an EOS NAL unit in each PU, and the two EOS NAL units have nuh_layer_id equal to 0 and 1. And note that any EOS NAL units are required to have TemporalId equal to 0. Through an extraction process that keeps only the lowest sublayer in each layer, NAL units with TemporalId equal to 1 would be removed, and consequently, both of the EOS NAL units that were in AU n would become part of the PU with nuh_layer_id equal to 1 in AU n−1. This would then violate the rule that the nuh_layer_id of an EOS NAL unit shall be equal to the nuh_layer_id of the associated VCL NAL unit. Therefore, it needs to be allowed for an EOS NAL unit's nuh_layer_id to be different from the nuh_layer_id of the associated VCL NAL unit, and it also needs to be allowed for one PU to contain more than one EOS NAL unit.

3) In clause 7.4.2.4.3 (Order of PUs and their association to AUs), it is specified that, when present, the next PU of a particular layer after a PU that belongs to the same layer and contains an EOS NAL unit shall be a CLVSS PU. However, as described above, it needs to be allowed for an EOS NAL unit's nuh_layer_id to be different from the nuh_layer_id of the associated VCL NAL unit. Therefore, the constraint herein needs to be changed accordingly.
4) In clause 7.4.2.4.4 (Order of NAL units and coded pictures and their association to PUs), it is specified that, when an EOS NAL unit is present in a PU, it shall be the last NAL unit among all NAL units within the PU other than an EOB NAL unit (when present). However, as described above, it needs to be allowed for one PU to contain more than one EOS NAL unit. Therefore, the constraint herein needs to be changed accordingly.
5) In clause 7.4.3.10 (End of sequence RBSP semantics), it is specified that, when present, the EOS RBSP specifies that the current PU is the last PU in the CLVS in decoding order and the next subsequent PU in the bitstream in decoding order (if any) is an TRAP or GDR PU. However, as described above, a PU may contain an EOS NAL unit of a different layer, therefore, this constraint needs to be changed accordingly.

5. A LISTING OF TECHNICAL SOLUTIONS AND EMBODIMENTS

To solve the above problems, and others, methods as summarized below are disclosed. The items should be considered as examples to explain the general concepts and should not be interpreted in a narrow way. Furthermore, these items can be applied individually or combined in any manner.
1) To solve problem 1, in clause 3 (Definitions), in the NOTE as part of the definition of CLVS picture, change the phrase "the first PU in the layer of the bitstream that follows an EOS NAL unit in decoding order" to be "the first PU in the layer of the bitstream that follows an EOS NAL unit in the layer in decoding order".
2) To solve problem 2, instead of requiring the nuh_layer_id of an EOS NAL unit to be equal to the nuh_layer_id of the associated VCL NAL unit, it is specified that the nuh_layer_id of an EOS NAL unit shall be equal to one of the nuh_layer_id values of the layers present in the CVS.
   a. In one example, furthermore, it is allowed for one PU to contain more than one EOS NAL unit.
   b. In one example, furthermore, the value of nuh_layer_id of an EOS NAL unit is required to be less than or equal to the nuh_layer_id of the associated VCL NAL unit.
3) To solve problem 3, it is specified that, when present, the next PU of a particular layer after an EOS NAL unit that belongs to the same layer shall be an TRAP or GDR PU.
   a. Alternatively, it is specified that, when present, the next PU of a particular layer after an EOS NAL unit that belongs to the same layer shall be a CLVSS PU.
4) To solve problem 4, it is specified that, when an EOS NAL unit is present in a PU, it shall be the last NAL unit among all NAL units within the PU other than other EOS NAL units (when present) or an EOB NAL unit (when present).
5) To solve problem 4, it is specified that, when present, the EOS RBSP specifies that the next subsequent PU that belongs to the same layer as the EOS NAL unit in the bitstream in decoding order (if any) is an TRAP or GDR PU.

6. EMBODIMENTS

Below are some example embodiments for some of the invention aspects summarized above in Section 5, which can be applied to the VVC specification. The changed texts are based on the latest VVC text in JVET-R2001-vA/v10. Most relevant parts that have been added or modified are highlighted in boldface underline, and some of the deleted parts are highlighted in [[ *boldface italics in double square brackets* ]]. There may be some other changes that are editorial in nature and thus not highlighted.

6.1. First Embodiment

This embodiment is for items 1, 2, 2a, 2b, 3, 4, and 5.
3 Definitions
. . .
   coded layer video sequence (CLVS): A sequence of PUs with the same value of nuh_layer_id that consists, in decoding order, of a CLVSS PU, followed by zero or more PUs that are not CLVSS PUs, including all subsequent PUs up to but not including any subsequent PU that is a CLVSS PU.
   NOTE—A CLVSS PU may be an IDR PU, a CRA PU, or a GDR PU. The value of NoOutputBeforeRecoveryFlag is equal to 1 for each IDR PU, and each CRA PU that has HandleCraAsClvsStartFlag equal to 1, and each CRA or GDR PU that is the first PU in the layer of the bitstream in decoding order or the first PU in the layer of the bitstream that follows an EOS NAL unit in the layer in decoding order.
. . .
7.4.2.2 NAL Unit Header Semantics
. . .
nuh_layer_id specifies the identifier of the layer to which a VCL NAL unit belongs or the identifier of a layer to which a non-VCL NAL unit applies. The value of nuh_layer_id shall be in the range of 0 to 55, inclusive. Other values for nuh_layer_id are reserved for future use by ITU-T ISO/IEC. The value of nuh_layer_id shall be the same for all VCL NAL units of a coded picture. The value of nuh_layer_id of a coded picture or a PU is the value of the nuh_layer_id of the VCL NAL units of the coded picture or the PU. When nal_unit_type is equal to PH_NUT, [[ *EOS_NUT,* ]] or FD_NUT, nuh_layer_id shall be equal to the nuh_layer_id of the associated VCL NAL unit.
When nal_unit_type is equal to EOS_NUT, nuh_layer_id shall be equal to one of the nuh_layer_id values of the layers present in the CVS.
   NOTE 1—The value of nuh_layer_id for DCI, VPS, AUD, and EOB NAL units is not constrained.
. . .
   7.4.2.4.3 Order of PUs and their association to AUs
. . .
   It is a requirement of bitstream conformance that, when present, the next PU of a particular layer after [[ *a PU* ]] an EOS NAL unit that belongs to the same layer [[ *and contains an EOS NAL unit* ]] shall be an IRAP or GDR PU [[*a CLVSS PU, which is either an IRAP PU with NoOutputBeforeRecoveryFlag equal to 1 or a GDR PU with NoOutputBeforeRecoveryFlag equal to 1.*]]
. . .

7.4.2.4.4 Order of NAL Units and Coded Pictures and Their Association to PUs A PU consists of zero or one PH NAL unit, one coded picture, which comprises of one or more VCL NAL units, and zero or more other non-VCL NAL units. The association of VCL NAL units to coded pictures is described in clause 7.4.2.4.5.

When a picture consists of more than one VCL NAL unit, a PH NAL unit shall be present in the PU.

When a VCL NAL unit has sh_picture_header_in_slice_header_flag equal to 1 or is the first VCL NAL unit that follows a PH NAL unit, the VCL NAL unit is the first VCL NAL unit of a picture.

The order of the non-VCL NAL units (other than the AUD and EOB NAL units) within a PU shall obey the following constraints:

- When a PH NAL unit is present in a PU, it shall precede the first VCL NAL unit of the PU.
- When any DCI NAL units, VPS NAL units, SPS NAL units, PPS NAL units, prefix SEI NAL units, NAL units with nal_unit_type equal to RSV_NVCL_26, or NAL units with nal_unit_type in the range of UNSPEC_28 . . . UNSPEC_29 are present in a PU, they shall not follow the last VCL NAL unit of the PU.
- When any DCI NAL units, VPS NAL units, SPS NAL units, or PPS NAL units are present in a PU, they shall precede the PH NAL unit (when present) of the PU and shall precede the first VCL NAL unit of the PU.
- NAL units having nal_unit_type equal to SUFFIX_SEI_NUT, FD_NUT, or RSV_NVCL_27, or in the range of UNSPEC_30 . . . UNSPEC_31 in a PU shall not precede the first VCL NAL unit of the PU.
- When any prefix APS NAL units are present in a PU, they shall precede the first VCL unit of the PU.
- When any suffix APS NAL units are present in a PU, they shall follow the last VCL unit of the PU.
- When an EOS NAL unit is present in a PU, it shall be the last NAL unit among all NAL units within the PU other than other EOS NAL units (when present) or an EOB NAL unit (when present).

7.4.3.10 End of Sequence RBSP Semantics

When present in a bitstream, an EOS NAL unit is considered belonging to or being in the layer that has nuh_layer_id equal to the nuh_layer_id of the EOS NAL unit.

When present, the EOS RBSP specifies that [[ *the current PU is the last PU in the CLVS in decoding order and* ]] the next subsequent PU that belongs to the same layer as the EOS NAL unit in the bitstream in decoding order (if any) is an IRAP or GDR PU. The syntax content of the SODB and RBSP for the EOS RBSP are empty.

FIG. 1 is a block diagram showing an example video processing system 1900 in which various embodiments disclosed herein may be implemented. Various implementations may include some or all of the components of the system 1900. The system 1900 may include input 1902 for receiving video content. The video content may be received in a raw or uncompressed format, e.g., 8- or 10-bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present disclosure. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interface (PCI), integrated drive electronics (IDE) interface, and the like. The embodiments described in the present disclosure may be embodied in various electronic devices such as mobile phones, laptops, smartphones or other devices that are capable of performing digital data processing and/or video display.

Figure 2:
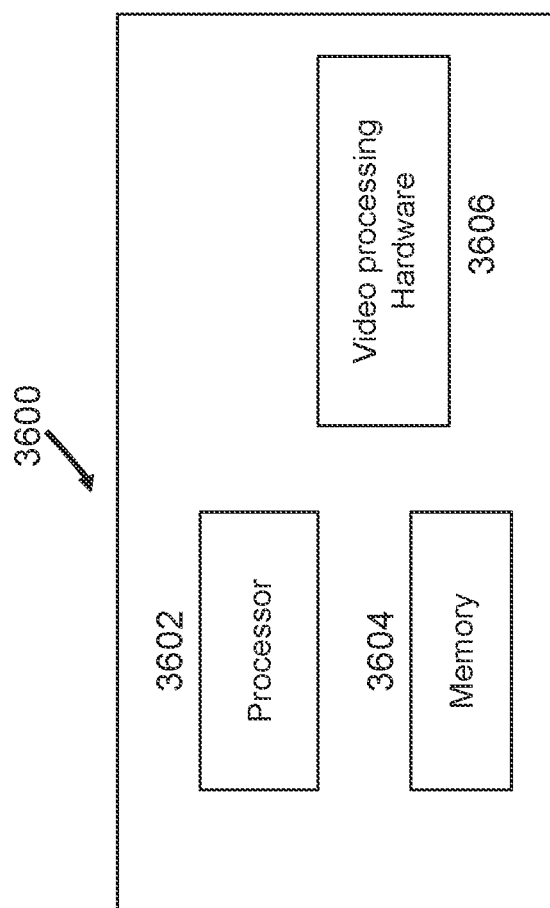
FIG. 2 is a block diagram of an example hardware platform used for video processing.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present disclosure. The memory (memories) 3604 may be used for storing data and code used for implementing the methods and embodiments described herein. The video processing hardware 3606 may be used to implement, in hardware circuitry, some embodiments described in the present disclosure.

Figure 4:
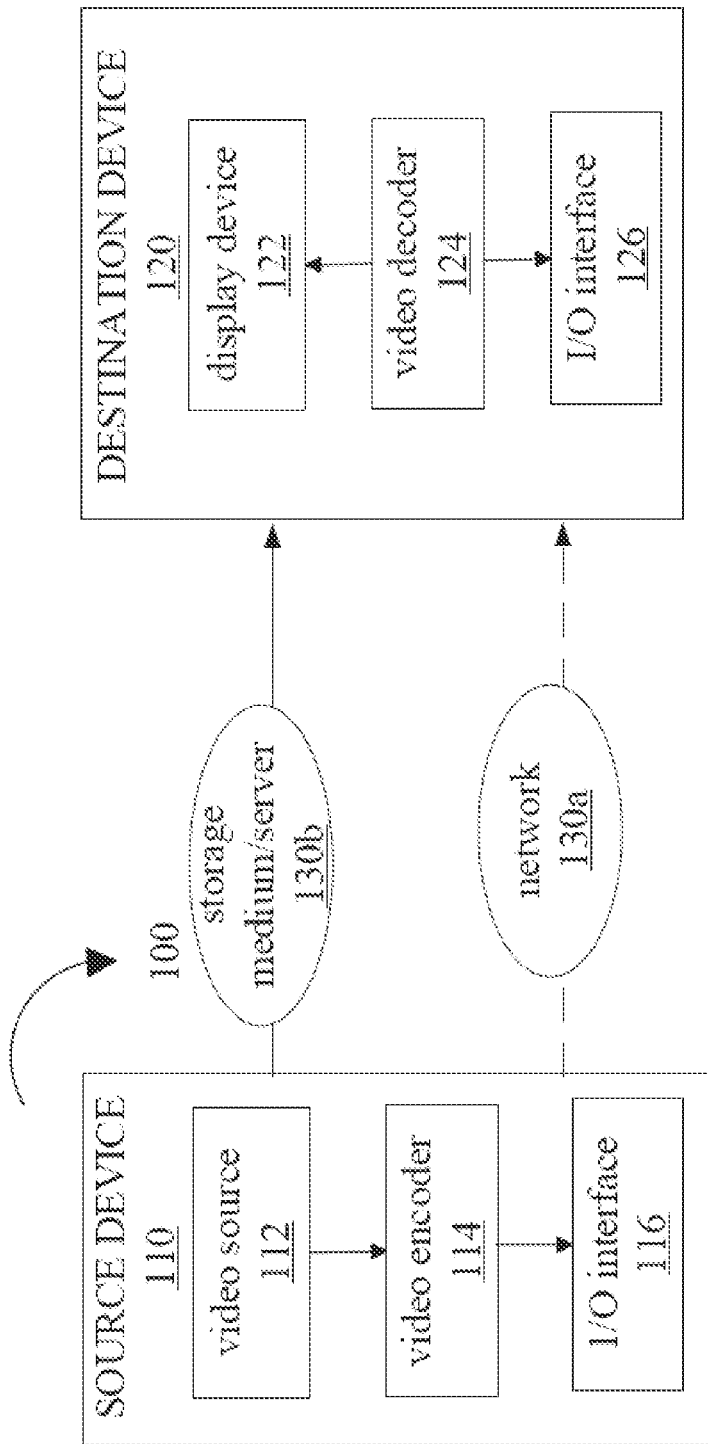
FIG. 4 is a block diagram that illustrates an example video coding system.

FIG. 4 is a block diagram that illustrates an example video coding system 100 that may utilize the embodiments of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 5:
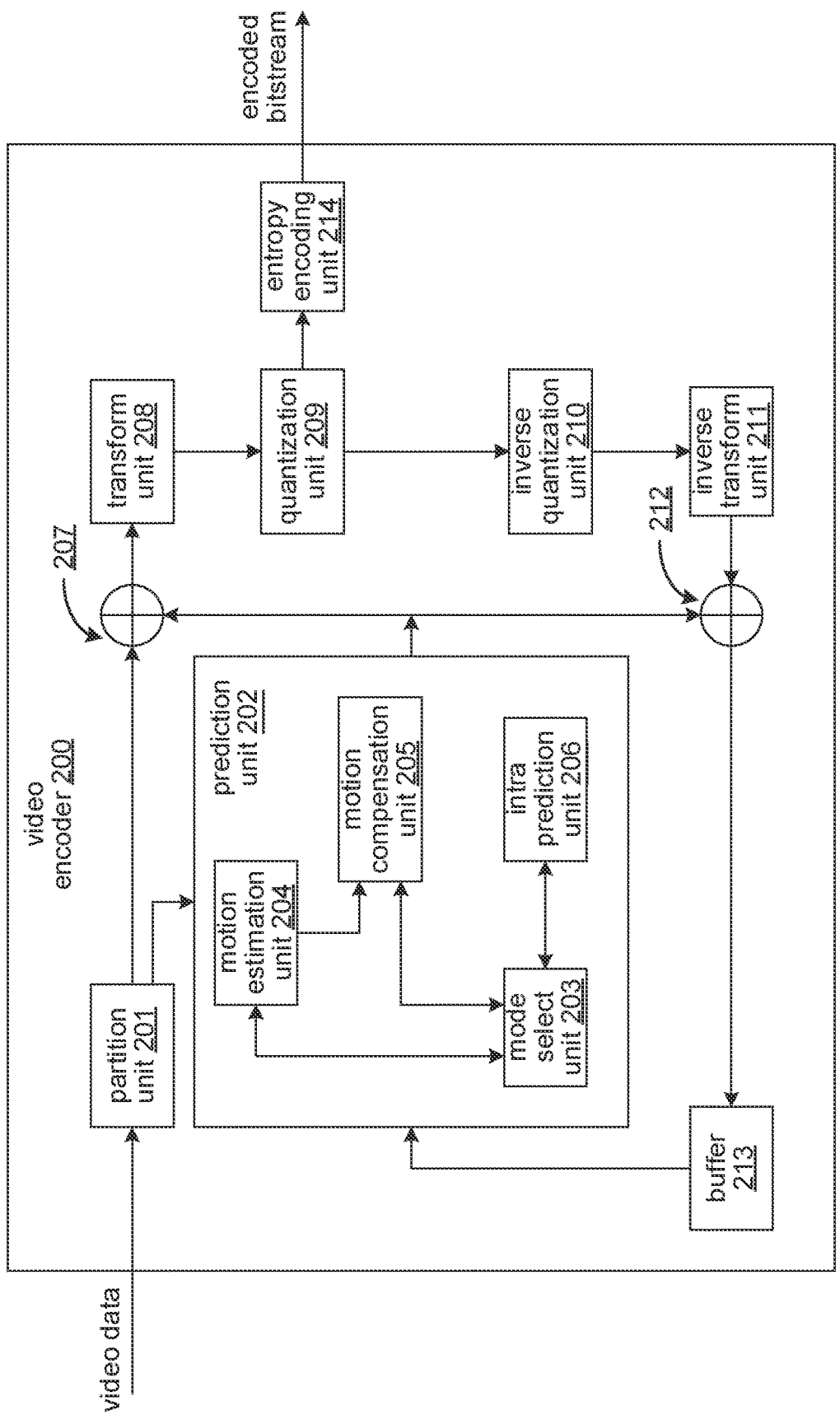
FIG. 5 is a block diagram that illustrates an encoder in accordance with some embodiments of the present disclosure.

FIG. 5 is a block diagram illustrating an example of video encoder 200, which may be video encoder 114 in the system 100 illustrated in FIG. 4.

Video encoder 200 may be configured to perform any or all of the embodiments of this disclosure. In the example of FIG. 5, video encoder 200 includes a plurality of functional components. The embodiments described in this disclosure may be shared among the various components of video encoder 200. In some examples, a processor may be configured to perform any or all of the embodiments described in this disclosure.

The functional components of video encoder 200 may include a partition unit 201, a prediction unit 202, which may include a mode select unit 203, a motion estimation unit 204, a motion compensation unit 205, and an intra prediction unit 206; a residual generation unit 207; a transform unit 208; a quantization unit 209; an inverse quantization unit 210; an inverse transform unit 211; a reconstruction unit 212; a buffer 213; and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some examples, mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signalling techniques that may be implemented by video encoder 200 include advanced motion vector prediction (AMVP) and merge mode signalling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed to reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
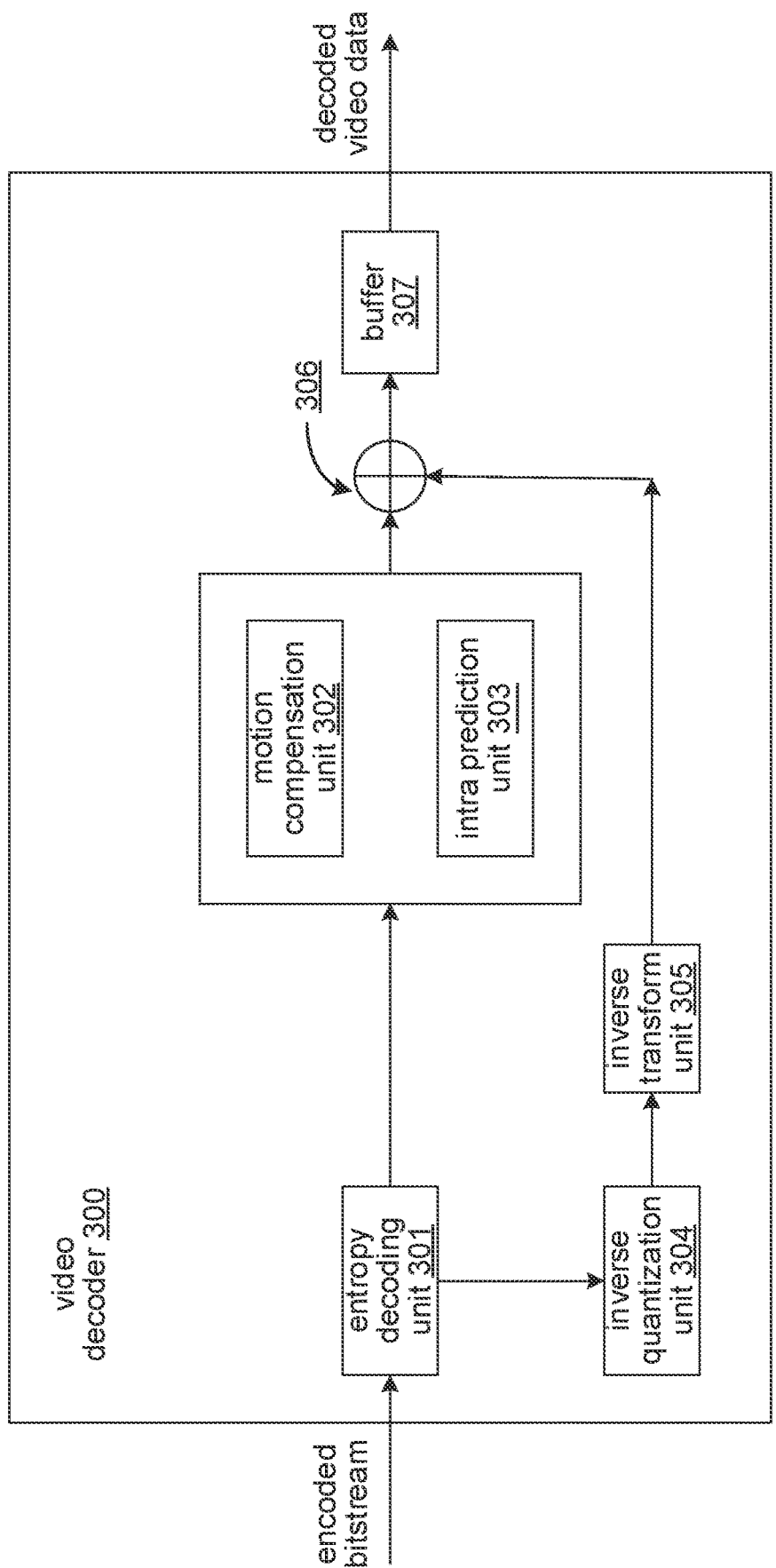
FIG. 6 is a block diagram that illustrates a decoder in accordance with some embodiments of the present disclosure.

FIG. 6 is a block diagram illustrating an example of video decoder 300 which may be video decoder 124 in the system 100 illustrated in FIG. 4.

The video decoder 300 may be configured to perform any or all of the embodiments of this disclosure. In the example of FIG. 6, the video decoder 300 includes a plurality of functional components. The embodiments described in this disclosure may be shared among the various components of the video decoder 300. In some examples, a processor may be configured to perform any or all of the embodiments described in this disclosure.

In the example of FIG. 6, video decoder 300 includes an entropy decoding unit 301, a motion compensation unit 302, an intra prediction unit 303, an inverse quantization unit 304, an inverse transformation unit 305, a reconstruction unit 306, and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transformation unit 305 applies an inverse transform.

Reconstruction unit 306 may sum the residual blocks with the corresponding prediction blocks generated by motion compensation unit 302 or intra prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of solutions preferred by some embodiments is provided next.

The following solutions show example embodiments discussed in the previous section (e.g., item 1).

Figure 3:
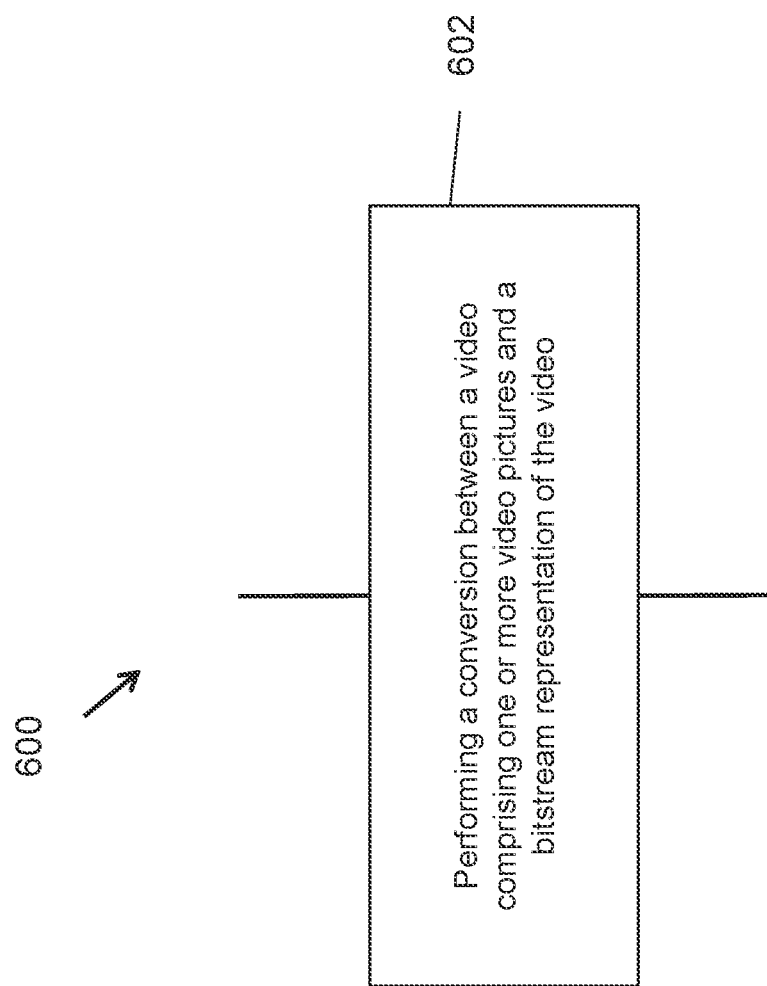
FIG. 3 is a flowchart for an example method of video processing.

1. A method of video processing (e.g., method 600 in FIG. 3), comprising performing (602) a conversion between a video comprising one or more video pictures and a bitstream representation of the video, wherein the coded representation conforms to a format rule, wherein the format rule specifies that a first picture unit (PU) in a layer of the bitstream that follows an end of sequence network abstraction layer (EOS NAL) unit in the layer in a decoding order.

The following solutions show example embodiments discussed in the previous section (e.g., item 2).

2. A video processing method, comprising: performing a conversion between a video comprising one or more video pictures and a bitstream representation of the video, wherein the bitstream representation comprises a coded video sequence having one or more video layers, wherein the bitstream representation conforms to a format rule that specifies that a layer identifier of an end of sequence network abstraction layer (EOS NAL) unit is equal to another layer identifier of one of the video layers in the coded video sequence.

3. The method of solution 1, wherein the format rule further permits inclusion of more than one EOS NAL units in a picture unit (PU).

The following solutions show example embodiments discussed in the previous section (e.g., item 1).

4. A video processing method, comprising: performing a conversion between a video comprising one or more video pictures and a bitstream representation of the video, wherein the bitstream representation comprises a coded video sequence having one or more video layers, wherein the bitstream representation conforms to a format rule that specifies that a next picture unit of a particular layer after an end of sequence network abstraction layer (EOS NAL) unit that belongs to a same layer is an intra random access point or a gradual decoding refresh picture unit.

The following solutions show example embodiments discussed in the previous section (e.g., item 4).

5. A video processing method, comprising: performing a conversion between a video comprising one or more video pictures and a bitstream representation of the video, wherein the bitstream representation comprises a coded video sequence having one or more video layers, wherein the bitstream representation conforms to a format rule that specifies that an EOS NAL unit in a picture unit is a last NAL unit among all NAL units within the PU other than other EOS NAL units or an EOB NAL unit.

The following solutions show example embodiments discussed in the previous section (e.g., item 5).

6. A video processing method, comprising: performing a conversion between a video comprising one or more video pictures and a bitstream representation of the video, wherein the bitstream representation comprises a coded video sequence having one or more video layers, wherein the bitstream representation conforms to a format rule that specifies that an EOS RBSP specifies that a next subsequent PU that belongs to a same layer as the EOS NAL unit in the bitstream in decoding order must be an TRAP or a GDR PU.

7. The method of any of solutions 1-6, wherein performing the conversion comprises encoding the video into the coded representation.

8. The method of any of solutions 1-6, wherein performing the conversion comprises parsing and decoding the coded representation to generate the video.

9. A video decoding apparatus comprising a processor configured to implement a method recited in one or more of solutions 1 to 8.

10. A video encoding apparatus comprising a processor configured to implement a method recited in one or more of solutions 1 to 8.

11. A computer program product having computer code stored thereon, the code, when executed by a processor, causes the processor to implement a method recited in any of solutions 1 to 8.

12. A method, apparatus or system described in the present disclosure.

Some preferred embodiments are described below.

Figures 7, 8:
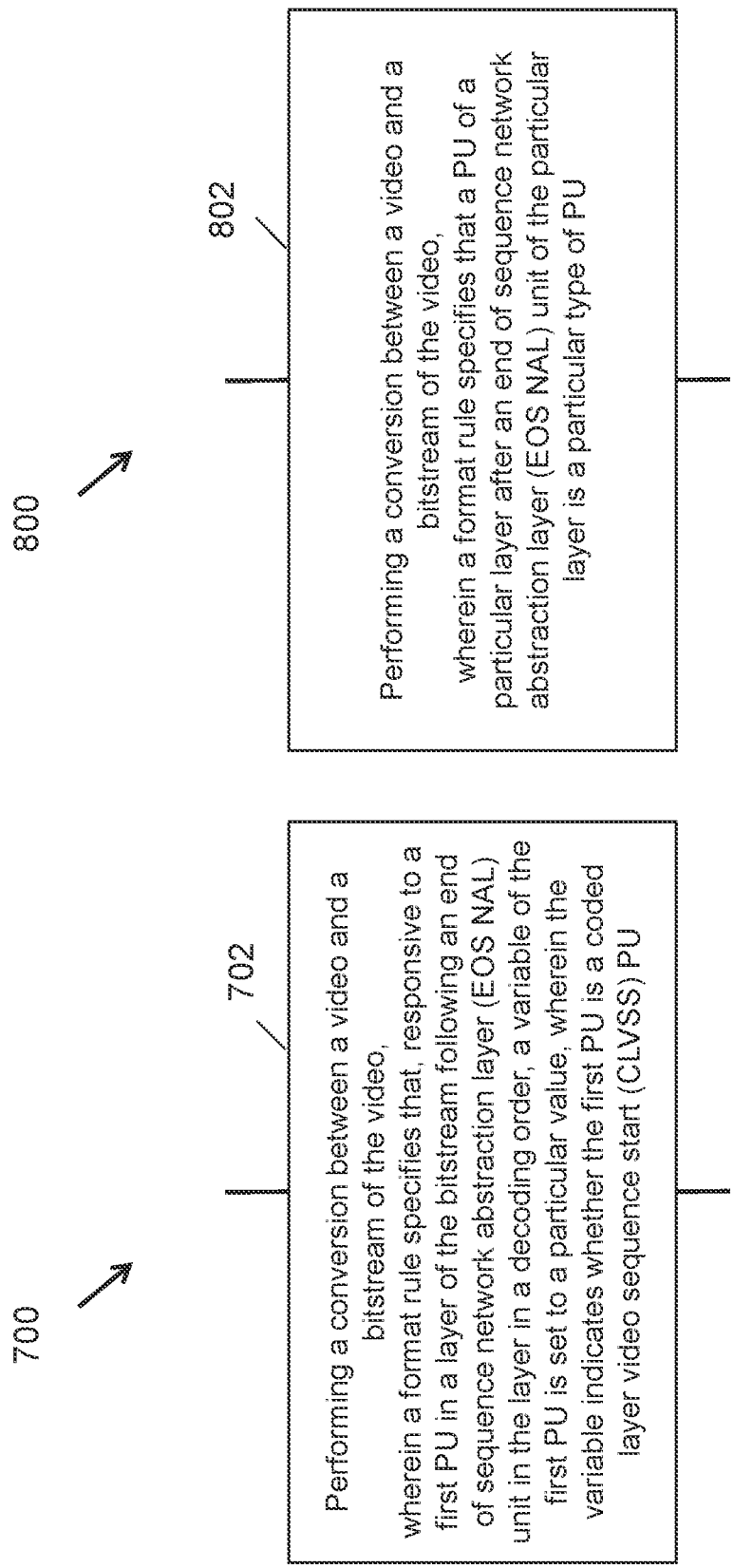

In some embodiments (see, e.g., item 1 in section 5), a method of video processing (e.g., method 700 depicted in FIG. 7) includes performing (702) a conversion between a video and a bitstream of the video, wherein the bitstream conforms to a format rule, wherein the bitstream comprises one or more layers comprising one or more picture units (PUs), wherein the format rule specifies that, responsive to a first PU in a layer of the bitstream following an end of sequence network abstraction layer (EOS NAL) unit in the layer in a decoding order, a variable of the first PU is set to a particular value, wherein the variable indicates whether the first PU is a coded layer video sequence start (CLVSS) PU. In some embodiments, the first PU is an instantaneous decoding refresh PU. In some embodiments, the first PU is a clean random access PU, and another variable of the clean random access PU is set to indicate that the clean random access PU is handled as the CLVSS PU. In some embodiments, the first PU is a clean random access PU. In some embodiments, the first PU is a gradual decoding refresh PU. In some embodiments, the first PU is a first PU in the layer in the decoding order. In some embodiments, the variable corresponds to NoOutputBeforeRecoveryFlag.

In some embodiments (see, e.g., item 3 in section 5), a method (e.g., method 800 depicted in FIG. 8) of video processing includes performing (802) a conversion between a video and a bitstream of the video, wherein the bitstream includes one or more layers comprising one or more picture units (PUs) according to a format rule; wherein the format rule specifies that a PU of a particular layer after an end of sequence network abstraction layer (EOS NAL) unit of the particular layer is a particular type of PU. In some embodiments, the particular type of PU is one of an intra random access point (TRAP) type or a gradual decoding refresh (GDR) type. In some embodiments, the particular type of PU is a coded layer video sequence start (CLVSS) PU.

In some embodiments (see, e.g., item 5 in section 5), a method (e.g., method 900 depicted in FIG. 9) of video processing include performing (902) a conversion between a video and a bitstream of the video, wherein the bitstream includes one or more layers comprising one or more picture units (PUs) according to a format rule, wherein the format rule specifies that, when present, an end of sequence (EOS) raw byte sequence payload (RBSP) syntax structure specifies that a next subsequent PU that belongs to a same layer as the EOS network abstraction layer (NAL) unit in the bitstream in a decoding order is of a particular PU type from an intra random access point (TRAP) PU type or a gradual decoding refresh (GDR) PU type. In some embodiments, the particular PU type is the IRAP PU type. In some embodiments, the particular PU type is the GDR PU type.

In some embodiments (see, e.g., item 2 in section 5), a method (e.g., method 1000 depicted in FIG. 10) of video processing includes performing (1002) a conversion between a video and a bitstream of the video, wherein the bitstream comprises one or more layers comprising one or more network abstraction layer (NAL) units according to a format rule, wherein the format rule specifies that a first layer identifier in a header of an end of sequence network abstraction layer (EOS NAL) unit is required to be equal to a second layer identifier of one of the one or more layers in the bitstream. In some embodiments, the format rule further allows for inclusion of more than one EOS NAL units in a picture unit (PU). In some embodiments, the format rule specifies that the first layer identifier of the EOS NAL unit is required to be less than or equal to a third layer identifier of a video coding layer (VCL) NAL unit associated with the EOS NAL unit.

Figure 11:
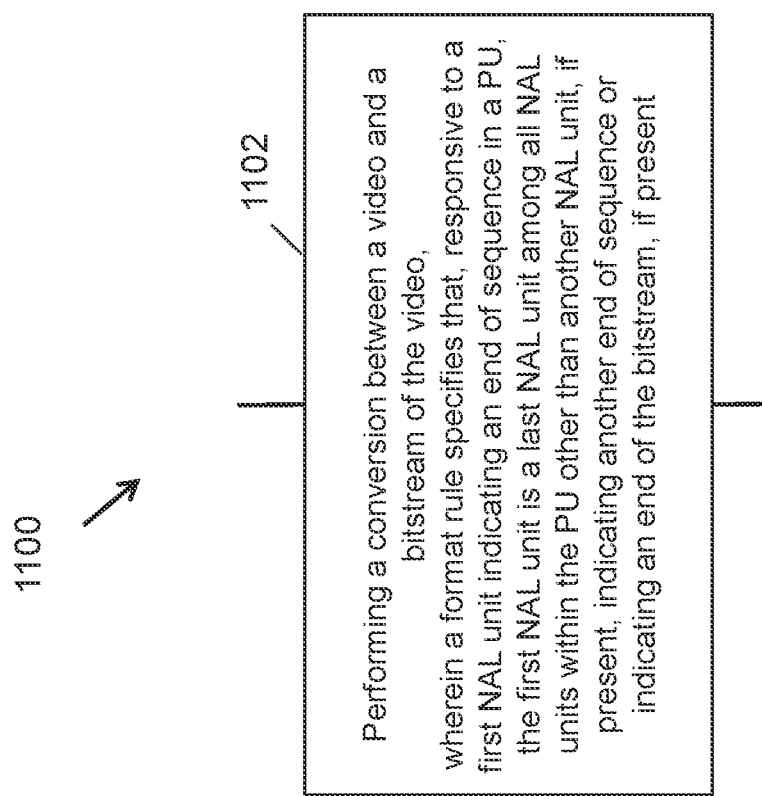

In some embodiments (see, e.g., item 4 in section 5), a method (e.g., method 1100 depicted in FIG. 11) of video processing includes performing (1102) a conversion between a video and a bitstream of the video, wherein the bitstream comprises one or more layers comprising one or more picture units (PUs) comprising one or more network abstraction layer (NAL) units according to format rule, wherein the format rule specifies that, responsive to a first NAL unit indicating an end of sequence in a PU, the first NAL unit is a last NAL unit among all NAL units within the PU other than another NAL unit, if present, indicating another end of sequence or indicating an end of the bitstream, if present. In some embodiments, the another NAL unit is an end of sequence (EOS) NAL unit. In some embodiments, the another NAL unit is an end of bitstream (EOB) NAL unit.

In the above-disclosed embodiments, the PU may have a format that comprises a picture header NAL unit, a coded picture comprising one or more video coding layer NAL units and zero or more non-video coding layer NAL units.

In the above-disclosed embodiments, performing the conversion comprises encoding the video into the bitstream.

In the above-disclosed embodiments, performing the conversion comprises decoding the video from the bitstream.

In some embodiments, a video decoding apparatus comprising a processor may be configured to implement a method described in any of the above disclosed embodiments.

In some embodiments, a video encoding apparatus comprising a processor may be configured to implement an above-described method.

In some embodiments, a computer program product may have computer code stored thereon, the code, when executed by a processor, causing the processor to implement an above-disclosed method.

In some embodiments, a method of bitstream generation, includes generating a bitstream according to a method recited in any one or more of the above claims; and storing the bitstream on a computer-readable program medium.

In some embodiments, a non-transitory computer-readable recording medium may store a bitstream of a video which is generated by a method performed by a video processing apparatus, wherein the method comprises generating the bitstream according to a method disclosed herein.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language disclosure), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electronically erasable programmable read-only memory (EEPROM), and flash memory devices; magnetic disks, e.g., internal hard disks or removable disks; magneto optical disks; and compact disc, read-only memory (CD-ROM) and digital versatile disc, read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of this disclosure. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method of video processing, comprising:
performing a conversion between a video and a bitstream of the video according to a first format rule and a third format rule,
wherein the bitstream comprises one or more layers comprising one or more network abstraction layer (NAL) units,
wherein the first format rule specifies that a first layer identifier of an end of sequence network abstraction layer (EOS NAL) unit is required to be equal to a second layer identifier of one of the one or more layers in the bitstream, and
wherein the third format rule specifies that a picture unit (PU) of a particular layer after an EOS NAL unit of the particular layer shall be an intra random access point (IRAP) PU or a gradual decoding refresh (GDR) PU.

2. The method of claim 1, wherein the first format rule further allows for inclusion of more than one EOS NAL units in a PU.

3. The method of claim 1, wherein the first format rule specifies that the first layer identifier of the EOS NAL unit is required to be less than or equal to a third layer identifier of a video coding layer (VCL) NAL unit associated with the EOS NAL unit.

4. The method of claim 1, wherein the conversion is performed according to a second format rule,
wherein the bitstream comprises one or more layers comprising one or more PUs comprising one or more NAL units, and
wherein the second format rule specifies that, responsive to a first NAL unit indicating an end of sequence in a PU, the first NAL unit is a last NAL unit among all NAL units within the PU other than another NAL unit, if present, indicating another end of sequence or indicating an end of the bitstream, if present.

5. The method of claim 4, wherein the another NAL unit is an EOS NAL unit.

6. The method of claim 4, wherein the another NAL unit is an end of bitstream (EOB) NAL unit.

7. The method of claim 4, wherein the PU comprises a picture header NAL unit, a coded picture comprising one or more video coding layer NAL units and zero or more non-video coding layer NAL units.

8. The method of claim 1, wherein the performing the conversion comprises encoding the video into the bitstream.

9. The method of claim 1, wherein the performing the conversion comprises decoding the video from the bitstream.

10. The method of claim 1, wherein the conversion is performed according to a fourth format rule,
wherein the fourth format rule specifies that, when present, an EOS raw byte sequence payload (RBSP) syntax structure specifies that a next subsequent PU that belongs to a same layer as the EOS NAL unit in the bitstream in a decoding order is of a particular PU type from an IRAP PU type or a GDR PU type.

11. An apparatus for processing video data comprising a processor and a non-transitory memory with instructions thereon, wherein the instructions upon execution by the processor, cause the processor to:
perform a conversion between a video and a bitstream of the video according to a first format rule and a third format rule,
wherein the bitstream comprises one or more layers comprising one or more network abstraction layer (NAL) units,
wherein the first format rule specifies that a first layer identifier of an end of sequence network abstraction layer (EOS NAL) unit is required to be equal to a second layer identifier of one of the one or more layers in the bitstream, and
wherein the third format rule specifies that a picture unit (PU) of a particular layer after an EOS NAL unit of the particular layer shall be an intra random access point (IRAP) PU or a gradual decoding refresh (GDR) PU.

12. The apparatus of claim 11, wherein the first format rule further allows for inclusion of more than one EOS NAL units in a PU, and
wherein the first format rule specifies that the first layer identifier of the EOS NAL unit is required to be less than or equal to a third layer identifier of a video coding layer (VCL) NAL unit associated with the EOS NAL unit.

13. The apparatus of claim 11, wherein the conversion is performed according to a second format rule,
wherein the bitstream comprises one or more layers comprising one or more PUs comprising one or more NAL units, and
wherein the second format rule specifies that, responsive to a first NAL unit indicating an end of sequence in a PU, the first NAL unit is a last NAL unit among all NAL units within the PU other than another NAL unit, if present, indicating another end of sequence or indicating an end of the bitstream, if present.

14. The apparatus of claim 13, wherein the another NAL unit is an EOS NAL unit.

15. The apparatus of claim 13, wherein the another NAL unit is an end of bitstream (EOB) NAL unit.

16. The apparatus of claim 13, wherein the PU comprises a picture header NAL unit, a coded picture comprising one or more video coding layer NAL units and zero or more non-video coding layer NAL units.

17. A non-transitory computer-readable storage medium storing instructions that cause a processor to:

perform a conversion between a video and a bitstream of the video according to a first format rule and a third format rule, wherein the bitstream comprises one or more layers comprising one or more network abstraction layer (NAL) units, wherein the first format rule specifies that a first layer identifier of an end of sequence network abstraction layer (EOS NAL) unit is required to be equal to a second layer identifier of one of the one or more layers in the bitstream, and wherein the third format rule specifies that a picture unit (PU) of a particular layer after an EOS NAL unit of the particular layer shall be an intra random access point (IRAP) PU or a gradual decoding refresh (GDR) PU.

18. The non-transitory computer-readable storage medium of claim 17, wherein the conversion is performed according to a second format rule, wherein the bitstream comprises one or more layers comprising one or more PUs comprising one or more NAL units, and wherein the second format rule specifies that, responsive to a first NAL unit indicating an end of sequence in a PU, the first NAL unit is a last NAL unit among all NAL units within the PU other than another NAL unit, if present, indicating another end of sequence or indicating an end of the bitstream, if present.

19. The non-transitory computer-readable storage medium of claim 18, wherein the another NAL unit is an EOS NAL unit or an end of bitstream (EOB) NAL unit.

20. A non-transitory computer-readable recording medium storing a bitstream of a video which is generated by a method performed by a video processing apparatus, wherein the method comprises:

generating the bitstream of the video according to a first format rule and a third format rule, wherein the bitstream comprises one or more layers comprising one or more network abstraction layer (NAL) units, wherein the first format rule specifies that a first layer identifier of an end of sequence network abstraction layer (EOS NAL) unit is required to be equal to a second layer identifier of one of the one or more layers in the bitstream, wherein the third format rule specifies that a picture unit (PU) of a particular layer after an EOS NAL unit of the particular layer shall be an intra random access point (IRAP) PU or a gradual decoding refresh (GDR) PU.

* * * * *